US012612180B2

(12) United States Patent
Raynaud et al.

(10) Patent No.: US 12,612,180 B2
(45) Date of Patent: Apr. 28, 2026

(54) FLIGHT MANAGEMENT METHOD AND DEVICE IN THE EVENT OF A CHALLENGING CONTEXT IN THE EVENT OF INCAPACITY OF AT LEAST ONE PILOT FLYING

(71) Applicants: Airbus SAS, Blagnac (FR); Airbus Operations SAS, Toulouse (FR)

(72) Inventors: Sylvain Raynaud, Toulouse (FR); Mathieu Rustin, Toulouse (FR); Hélène Da Costa Gomes, Toulouse (FR); Vincent Sibelle, Blagnac (FR); Hugues Van Der Stichel, Blagnac (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 100 days.

(21) Appl. No.: 18/411,195

(22) Filed: Jan. 12, 2024

(65) Prior Publication Data

US 2024/0253812 A1     Aug. 1, 2024

(30) Foreign Application Priority Data

Jan. 31, 2023    (FR) ....................................... 2300886

(51) Int. Cl.
    *B64D 45/00*          (2006.01)
    *B64F 5/60*           (2017.01)
(52) U.S. Cl.
    CPC ................. *B64D 45/00* (2013.01); *B64F 5/60* (2017.01); *B64D 2045/0085* (2013.01)
(58) Field of Classification Search
    None
    See application file for complete search history.

(56) References Cited

U.S. PATENT DOCUMENTS

| | | | |
|---|---|---|---|
| 9,870,000 B2 | 1/2018 | Stange | |
| 2007/0043482 A1* | 2/2007 | Aimar | G05D 1/817 |
| | | | 701/16 |
| 2008/0243315 A1* | 10/2008 | Ferro | G01C 23/00 |
| | | | 701/7 |
| 2017/0249852 A1* | 8/2017 | Haskins | G05D 1/0676 |

FOREIGN PATENT DOCUMENTS

EP          2506105 A2    10/2012

OTHER PUBLICATIONS

French Search Report for corresponding French Patent Application No. 2300886 dated Aug. 11, 2023.
Anonymous, "FMS-3000" https://www.smartcockpit.com/docs/P180_Avanti-FMS-3000_Guide.pdf retrieved from the Internet on Jun. 24, 2005.

* cited by examiner

*Primary Examiner* — Hitesh Patel
*Assistant Examiner* — Wenyuan Yang
(74) *Attorney, Agent, or Firm* — Greer, Burns & Crain Ltd.

(57)          ABSTRACT

A device configured to warn a pilot flying an aircraft that erroneous data have been entered into a secondary flight plan, to monitor pressure in a cabin of the aircraft, to monitor operation of at least one engine of the aircraft, to determine a capacity of the pilot flying and to automatically activate an escape route when a depressurization of the cabin is detected or when a failure of at least one engine is detected and when an incapacitation of the pilot flying is detected. Also a method and an aircraft with such a device.

14 Claims, 3 Drawing Sheets

FLIGHT MANAGEMENT METHOD AND DEVICE IN THE EVENT OF A CHALLENGING CONTEXT IN THE EVENT OF INCAPACITY OF AT LEAST ONE PILOT FLYING

CROSS-REFERENCES TO RELATED APPLICATIONS

This application claims the benefit of French Patent Application Number FR2300886 filed on Jan. 31, 2023, the entire disclosure of which is incorporated herein by way of reference.

FIELD OF THE INVENTION

The present invention relates to a method and a device for managing flight in the event of a challenging context, implemented by a processing unit of an avionics computer of an aircraft, when the aircraft is in a flight phase in which a single pilot flying is at the controls of the aircraft instead of two pilots.

BACKGROUND OF THE INVENTION

The challenging context can correspond to a trajectory phase of an aircraft flying over high-altitude terrain (high mountains) or to a trajectory phase complying with ETOPS (Extended-range Twin-engine Operation Performance Standards) regulations. The ETOPS regulations allow twin-engine aircraft to follow trajectories passing through sectors that are more than one hour from a diversion airport.

The flight phase in which a single pilot flying is at the controls is managed by a set of operations called eMCO (extended Minimum Crew Operations). This set of eMCO operations implements systems, functions and procedures for overcoming the temporary absence of a second pilot, who can be off duty.

When the aircraft is in a trajectory phase in a challenging context and in a flight phase managed by the set of eMCO operations, the pilot flying can enter a secondary flight plan into the avionics computer of the aircraft. However, during a flight, the single pilot flying may not be capable of managing the control of the aircraft, for example, due to a deterioration in their psychophysiological state or for other reasons. The single pilot flying may then enter incorrect data for the secondary flight plan.

SUMMARY OF THE INVENTION

The present invention relates to a method and a device for managing a flight in a challenging context, allowing this disadvantage to be overcome.

The flight management method is intended to be implemented for an aircraft flying in accordance with a main flight plan.

According to the invention, the method comprises the following steps:

- a start-up step for implementing all the subsequent steps when the aircraft is in a challenging context;
- a preparation step, in which:
  - secondary flight plan data is entered by a pilot flying at the controls of the aircraft into a first memory of at least one avionics computer on board the aircraft using an input device, the secondary flight plan data entered by the pilot flying comprising at least one identifier of at least one waypoint and at least one altitude constraint of the one or more waypoints; and
  - secondary flight plan data is determined by the one or more avionics computers based on the secondary flight plan data entered by the pilot flying and on the performance capabilities of the aircraft, with the determined secondary flight plan data comprising at least one position of the one or more waypoints and at least one emergency trajectory;
- a warning step implemented by a first module for detecting and warning the pilot flying that erroneous data has been entered into the secondary flight plan during the preparation step;
- a monitoring step:
  - implemented by a second module for monitoring a pressure in a cabin of the aircraft based on pressure measurements transmitted by pressure sensors in the cabin; and
  - implemented by a third module for monitoring the operation of at least one engine of the aircraft based on data transmitted by engine operation sensors;
- a determination step implemented by a fourth module for determining the capability of the pilot flying;
- an activation step implemented by a fifth module for automatically activating an emergency trajectory corresponding to the emergency trajectory defined between positions of two consecutive waypoints between which the aircraft is located, the activation step being implemented:
  - if the aircraft encounters a challenging context;
  - if, on the one hand, cabin depressurization is detected in the monitoring step or if a failure of at least one engine is detected in the monitoring step; and
  - if, on the other hand, incapacitation of the pilot flying is detected in the determination step.

Thus, by virtue of the warning step, it is possible to ensure that the data entered by the pilot flying is not erroneous.

Furthermore, the method is implemented when the aircraft is in a flight phase in which a single pilot flying is at the controls of the aircraft.

According to a first embodiment, the warning step comprises the following sub-steps:

- a first determination sub-step for determining a vertical trajectory based on the one or more identifiers of the one or more waypoints, the one or more positions of the one or more waypoints, the one or more altitudes of the one or more waypoints and the one or more emergency trajectories;
- a first transmission sub-step for transmitting the vertical trajectory determined in the first determination sub-step to an altitude database;
- a second determination sub-step implemented by the altitude database for determining a terrain relief curve corresponding to the vertical altitude data of the vertical trajectory;
- a comparison sub-step implemented by the altitude database for comparing the vertical trajectory and the terrain relief curve;
- a second transmission sub-step implemented by the altitude database for generating at least one signal representing a warning if the vertical trajectory is likely to cross the terrain relief curve;
- a warning sub-step for notifying the pilot flying that erroneous data has been entered into the one or more avionics computers.

According to a second embodiment, the warning step comprises the following sub-steps:

a first comparison sub-step for comparing, on the one hand, the one or more identifiers of the one or more waypoints of the secondary flight plan and one or more identifiers of at least one waypoint previously stored in a second memory of the one or more avionics computers and, on the other hand, the one or more altitude constraints of the one or more waypoints of the secondary flight plan and one or more altitude constraints of at least one waypoint previously stored in the second memory of the one or more avionics computers;

a second comparison sub-step for comparing an order of waypoints previously stored in the second memory of the one or more avionics computers and an order of waypoints of the secondary flight plan;

a first warning sub-step for notifying the pilot flying that at least one identifier of a waypoint of the secondary flight plan does not correspond to at least one identifier of at least one waypoint previously stored in the second memory of the one or more avionics computers or that at least one altitude constraint of a waypoint of the secondary flight plan does not correspond to at least one altitude constraint of at least one waypoint previously stored in the second memory of the one or more avionics computers;

a second warning sub-step for notifying the pilot flying that the order of the waypoints of the secondary flight plan does not correspond to the order of the waypoints previously stored in the second memory of the one or more avionics computers.

Moreover, the emergency trajectory corresponds to an emergency trajectory toward a diversion airport, said emergency trajectory corresponding to an emergency trajectory toward a diversion airport as a function of the current position of the aircraft.

In addition, the emergency trajectory corresponds to a survival evacuation trajectory toward a survival altitude.

Furthermore, the activation step comprises an inhibition sub-step for inhibiting an altitude protection system in order to reach the survival altitude within a time corresponding to an oxygen endurance time of the aircraft if cabin depressurization is detected or in order to reach an equilibrium altitude if a failure of at least one engine is detected.

The invention also relates to a device for managing flight in the event of a challenging context, the device being installed on board an aircraft flying in accordance with a main flight plan.

According to the invention, the device comprises:

a first module configured for detecting and warning the pilot flying that erroneous data has been entered into a secondary flight plan when a pilot flying at the controls of the aircraft has entered secondary flight plan data into a first memory of at least one avionics computer on board the aircraft using an input device, the secondary flight plan data comprising at least one identifier of at least one waypoint and at least one altitude constraint of the one or more waypoints, the one or more avionics computers being configured for determining secondary flight plan data based on secondary flight plan data entered by the pilot flying and based on performance capabilities of the aircraft, the determined secondary flight plan data comprising at least one position of the one or more waypoints and at least one emergency trajectory;

a second module configured for monitoring a pressure in a cabin of the aircraft based on pressure measurements transmitted by pressure sensors in the cabin; and a third module configured for monitoring the operation of at least one engine of the aircraft based on data transmitted by engine operation sensors;

a fourth module configured for determining the capability of the pilot flying;

a fifth module configured for automatically activating an emergency trajectory corresponding to the emergency trajectory defined between the positions of two consecutive waypoints between which the aircraft is located, the emergency trajectory being activated:

if the aircraft encounters a challenging context;

if, on the one hand, cabin depressurization is detected by the second module or if a failure of at least one engine is detected by the third module; and if, on the other hand, incapacitation of the pilot flying is detected by the fourth module.

According to the first embodiment, in order to warn the pilot flying, the first module is further configured for:

determining a vertical trajectory based on the one or more identifiers of the one or more waypoints, the one or more positions of the one or more waypoints, the one or more altitudes of the one or more waypoints and the one or more emergency trajectories;

transmitting the vertical trajectory to an altitude database so that the altitude database determines a terrain relief curve corresponding to the vertical altitude data of the vertical trajectory;

notifying the pilot flying that erroneous data has been entered into the first memory of the one or more avionics computers after the altitude database has compared the vertical trajectory and the terrain relief curve and has generated a signal representing a warning if the vertical trajectory is likely to cross the terrain relief curve.

According to the second embodiment, in order to warn the pilot flying, the first module is configured for:

comparing, on the one hand, the one or more identifiers of the one or more waypoints of the secondary flight plan and one or more identifiers of at least one waypoint previously stored in a second memory of the one or more avionics computers and, on the other hand, the one or more altitude constraints of the one or more waypoints of the secondary flight plan and one or more altitude constraints of at least one waypoint previously stored in the second memory of the one or more avionics computers;

comparing an order of waypoints previously stored in the second memory of the one or more avionics computers and an order of waypoints of the secondary flight plan;

notifying the pilot flying that at least one identifier of a waypoint of the secondary flight plan does not correspond to at least one identifier of at least one previously stored waypoint or that at least one altitude constraint of a waypoint of the secondary flight plan does not correspond to at least one altitude constraint of at least one waypoint previously stored in the second memory of the one or more avionics computers;

notifying the pilot flying that the order of the waypoints of the secondary flight plan does not correspond to the order of the waypoints previously stored in the second memory of the one or more avionics computers.

Moreover, the emergency trajectory corresponds to an emergency trajectory toward a diversion airport, said emergency trajectory corresponding to an emergency trajectory toward a diversion airport as a function of the current position of the aircraft.

In addition, the emergency trajectory corresponds to a survival evacuation trajectory toward a survival altitude.

Furthermore, in order to automatically activate an emergency trajectory, the fifth module is configured for inhibiting an altitude protection system in order to reach the survival altitude within a time corresponding to an oxygen endurance time of the aircraft if cabin depressurization is detected or in order to reach an equilibrium altitude if a failure of at least one engine is detected.

The invention also relates to an aircraft comprising a flight management device such as that specified above.

BRIEF DESCRIPTION OF THE DRAWINGS

The attached figures will demonstrate how the invention can be implemented. In these figures, identical references designate similar elements.

DETAILED DESCRIPTION OF THE PREFERRED EMBODIMENTS

Figures 1, 2:
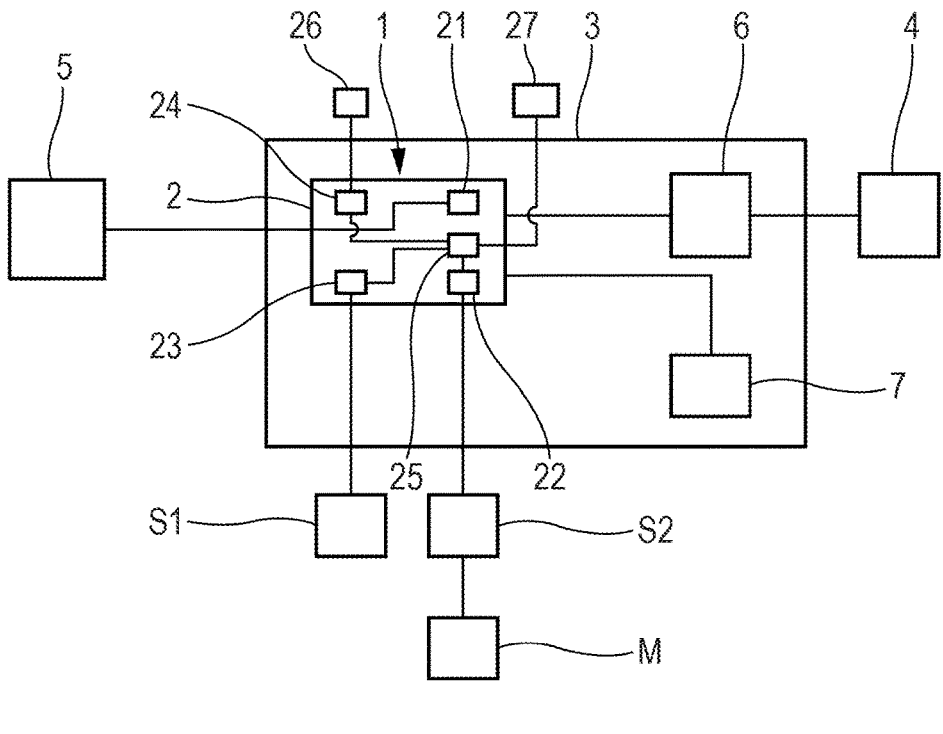
FIG. 1 is a schematic representation of the flight management device.
FIG. 2 is a schematic representation of the flight management method.
Figure 5:
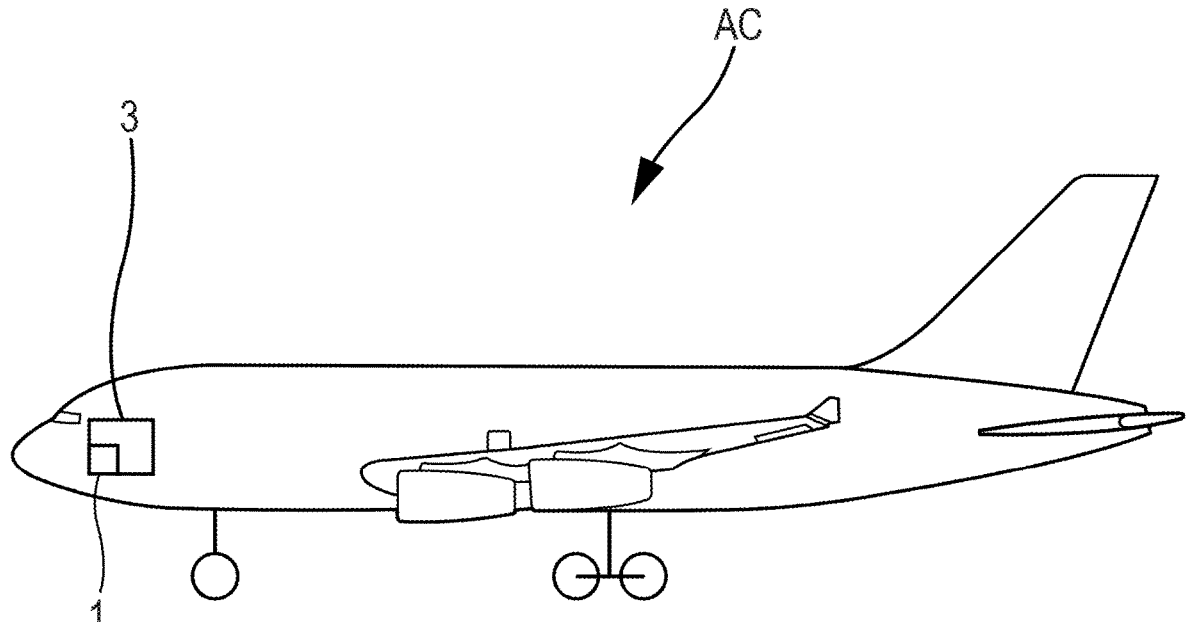
FIG. 5 shows an aircraft with the flight management system on board.

The device 1 for managing flight in the event of a challenging context, hereafter called "device 1", is highly schematically shown in FIG. 1. The device 1 is intended to be installed on board an aircraft (FIG. 5) capable of flying in accordance with a main flight plan.

The device can be implemented when the aircraft AC is in a flight phase in which a single pilot flying is at the controls of the aircraft AC. However, it also can be implemented when the aircraft AC is in a flight phase in which at least two pilots flying are at the controls of the aircraft AC.

The device 1 can be included in at least one avionics computer 3 of an aircraft AC.

An avionics computer 3 is a computer on board the aircraft AC. For example, an avionics computer 3 can correspond to a Flight Management System (FMS) of the aircraft AC, to a Primary flight control computer (PRIM), to a Secondary flight control computer (SEC), to a Full Authority Digital Engine Control (FADEC) system, to a cabin pressure control system or to any other avionics computers on board the aircraft AC.

Moreover, the device 1 is started-up in the event of a challenging context. The challenging context can correspond to a trajectory phase of an aircraft AC flying over high-altitude terrain or to a trajectory phase complying with ETOPS regulations.

In one embodiment, the device 1 can be started-up using a button in the cockpit of the aircraft AC. A pilot flying can press the button in order to start the device. In another embodiment, the device 1 can be started-up using parameters defined in the main flight plan, in which a waypoint at the beginning of the start-up of the device and a waypoint at the end define the start-up of the device 1.

When the aircraft AC encounters a challenging context, the pilot flying prepares a secondary flight plan. To this end, he enters secondary flight plan data into a first memory 6 of the one or more avionics computers 3 on board the aircraft AC using an input device 4.

The secondary flight plan data entered by the pilot flying includes at least one identifier of at least one waypoint and at least one altitude constraint of the one or more waypoints.

Secondary flight plan data is also determined by the one or more avionics computers 3, for example, the FMS, based on the secondary flight plan data entered by the pilot flying and based on the performance capabilities of the aircraft AC. The performance capabilities of the aircraft AC can correspond to a set of qualities that characterize the performance capabilities (acceleration, maximum speed, range, etc.) of the aircraft AC. The determined secondary flight plan data includes at least one position of the one or more waypoints and at least one emergency trajectory. The secondary flight plan data determined by the one or more avionics computers 3 also can be stored in the first memory 6 of the one or more avionics computers 3.

The device 1 comprises a first module 21 configured for detecting and warning the pilot flying at the controls of the aircraft AC that erroneous data has been entered into the first memory 6 of the one or more avionics computers 3 when the pilot flying has entered the secondary flight plan data into the first memory 6.

The first module 21 or even the one or more avionics computers 3 then can be configured to prompt the pilot flying to enter new secondary flight plan data.

The first module 21 can correspond to the FMS computer.

The pilot flying can then enter correct flight plan data.

The device 1 also comprises:

a second module 22 configured for monitoring a pressure in a cabin of the aircraft AC based on pressure measurements transmitted by pressure sensors S1 in the cabin; and a third module 23 for monitoring an operation of at least one engine M of the aircraft AC based on data transmitted by engine M operation sensors S2.

The second module 22 can thus detect cabin depressurization if the pressure in the cabin measured by the pressure sensors S1 is less than or equal to a predetermined threshold pressure. The third module 23 can also detect a failure of at least one engine M as a function of data transmitted by the engine M operation sensors S2.

The avionics computer 3 implementing the second module 22 can be a cabin pressure control system.

The avionics computer 3 implementing the third module 23 can be a FADEC computer.

The device 1 also comprises a fourth module 24 configured for determining the capability of the pilot flying.

According to one embodiment, the capability of the pilot can be determined using sensors such as sensors 26 for measuring the physiological parameters of the pilot flying. Depending on the physiological parameters measured by these sensors, the fourth module 24 is able to determine the capability of the pilot flying. The fourth module 24 is configured for determining the incapacitation of the pilot flying as a function of the physiological parameters.

According to another embodiment, the capability of the pilot can be determined as a function of a response expected by the one or more avionics computers 3, such as the FMS computer, following an invitation to enter secondary flight plan data. In this embodiment, the fourth module 24 is configured for determining the incapacitation of the pilot flying if no data is entered after a predetermined time.

The device 1 also comprises a fifth module 25 configured for automatically activating an emergency trajectory corresponding to the emergency trajectory defined between the positions of two consecutive waypoints between which the aircraft AC is located.

The avionics computer 3 implementing the fifth module 25 can be a primary flight control computer (PRIM).

Activation of a flight trajectory or flight plan corresponds to the implementation of the flight trajectory or flight plan by a device 1 for controlling the aircraft AC, such as an autopilot, configured so that the aircraft AC flies in accordance with the flight trajectory or flight plan.

The emergency trajectory is activated:

if the aircraft AC encounters a challenging context;

if, on the one hand, cabin depressurization is detected by the second module 22 or if a failure of at least one engine M is detected by the third module 23; and if, on the other hand, incapacitation of the pilot flying is detected by the fourth module 24.

In one embodiment of the device 1 shown in FIG. 1, the device 1 comprises a processing unit 2 comprising the first module 21, the second module 22, the third module 23, the fourth module 24 and the fifth module 25. The processing unit 2 is included in an avionics computer 3.

In other embodiments, the modules 21 to 25 are included in a single avionics computer 3 or are distributed over several avionics computers 3 that can be located at various locations on board the aircraft AC.

In addition, the modules 21 to 25 and/or the processing unit 2 can be duplicated.

The modules 21 to 25 can be software-integrated in the one or more avionics computers 3.

In a first embodiment, in order to detect and warn the pilot flying that erroneous data has been entered into the first memory 6 of the one or more avionics computers 3, the first module 21 is configured for:

determining a vertical trajectory based on the one or more identifiers of the one or more waypoints, the one or more positions of the one or more waypoints, the one or more altitudes of the one or more waypoints and the one or more emergency trajectories;

transmitting the vertical trajectory to an altitude database 5, so that the altitude database 5 determines a terrain relief curve corresponding to the vertical altitude data of the vertical trajectory;

notifying the pilot flying that erroneous data has been entered into the first memory 6 of the one or more avionics computers 3 after the altitude database 5 has compared the vertical trajectory and the terrain relief curve and has generated a signal representing a warning if the vertical trajectory is likely to cross the terrain relief curve.

The notification to the pilot flying can be implemented by any means, such as a warning message on the navigation screen of the aircraft AC, a warning message on the flight plan page, an audible alarm or a combination thereof.

The altitude database 5 can correspond to an Aircraft Environmental Surveillance System (AESS).

In a second embodiment, in order to detect and warn the pilot flying that erroneous data has been entered into the first memory 6 of the one or more avionics computers 3, the first module 21 is configured for:

comparing, on the one hand, the one or more identifiers of the one or more waypoints of the secondary flight plan and one or more identifiers of at least one waypoint previously stored in a second memory 7 of the one or more avionics computers 3 and, on the other hand, the one or more altitude constraints of the one or more waypoints of the secondary flight plan and one or more altitude constraints of at least one waypoint previously stored in the second memory 7 of the one or more avionics computers 3;

comparing an order of waypoints previously stored in the second memory 7 of the one or more avionics computers 3 and an order of waypoints of the secondary flight plan;

notifying the pilot flying that at least one identifier of a waypoint of the secondary flight plan does not correspond to at least one identifier of at least one previously stored waypoint or that at least one altitude constraint of a waypoint of the secondary flight plan does not correspond to at least one altitude constraint of at least one waypoint previously stored in the second memory 7 of the one or more avionics computers 3;

notifying the pilot flying that the order of the waypoints of the secondary flight plan does not correspond to the order of the waypoints previously stored in the second memory 7 of the one or more avionics computers 3;

For example, the one or more identifiers of the one or more waypoints of the secondary flight plan and one or more identifiers of at least one waypoint are previously stored in the second memory 7 of the one or more avionics computers 3 by the airline. The second memory 7 can correspond to a navigation database of the one or more avionics computers 3.

Furthermore, the emergency trajectory can correspond to an emergency trajectory toward a diversion airport if the challenging context corresponds to a trajectory phase complying with ETOPS regulations. Said emergency trajectory corresponds to an emergency trajectory toward a diversion airport as a function of the current position of the aircraft AC.

At least one emergency trajectory toward a diversion airport is defined in the secondary flight plan. To this end, the pilot flying defines equal time points on the trajectory of the aircraft. A diversion airport is defined between each of the equal time points. The aircraft AC therefore can be diverted to the defined diversion airport as a function of the current position of the aircraft AC. This configuration avoids a discontinuity between the secondary flight plan and the emergency trajectory. For the first portion, the one or more avionics computers 3 can implement the DIR-TO function.

If cabin depressurization is detected, the emergency trajectory is achieved by implementing an automatic emergency descent (AED) function in the one or more avionics computers 3 in accordance with a standard procedure.

If a failure of an engine M is detected, the one or more avionics computers 3 implement a standard guidance mode in the event of an engine M failure.

In addition, the emergency trajectory can correspond to a survival evacuation trajectory (or oxygen escape route). This configuration avoids a discontinuity between the secondary flight plan and the emergency trajectory. For the first portion, the one or more avionics computers 3 can implement the DIR-TO function.

For this trajectory, the aircraft AC is forced to descend to an altitude at which the outside temperature, pressure and oxygen concentration in the air are sufficient for the survival of the passengers and crew of the aircraft AC. This altitude is called "survival altitude" throughout the remainder of the description.

In the event of cabin depressurization, the descent of the aircraft AC is time-dependent. The aircraft AC must reach the survival altitude before the oxygen supply in the cabin is depleted. The time before oxygen depletion corresponds to the oxygen endurance time.

The aircraft AC can remain at as high an altitude as possible so as to avoid any obstacles until it can descend to the survival altitude within the oxygen endurance time.

At least one survival evacuation trajectory is defined in the secondary flight plan. The trajectory in a challenging context is divided into several segments. For each segment, a survival evacuation trajectory is defined starting from an escape coordinate (or escape fix). The escape fix can correspond to a waypoint originating from a ground-based air navigation assistant or to a waypoint stored in the one or more avionics computers 3.

Furthermore, in order to automatically activate an emergency trajectory, the fifth module 25 can be configured to inhibit an altitude protection system:

in order to reach the survival altitude within a time corresponding to an oxygen endurance time of the aircraft AC if cabin depressurization is detected; or in order to reach an equilibrium altitude if a failure of at least one engine M is detected.

The altitude protection system implements a "safety net" for the aircraft AC in order to protect the aircraft AC from erroneous guidance commands by stabilizing the aircraft AC at a predetermined safety altitude. The predetermined safety altitude is determined based on an altitude database. This altitude database provides a grid of minimum off-route altitudes (MORA). This grid offers an obstacle clearance margin of 2,000 feet (approximately 610 m) if the peak point is above 5,000 feet (approximately 1,525 m), and 1,000 feet (approximately 305 m) otherwise.

Inhibiting the altitude protection system allows the aircraft to descend below the safety altitude predetermined by the altitude database in order to reach the survival altitude or the equilibrium altitude.

Figure 3:
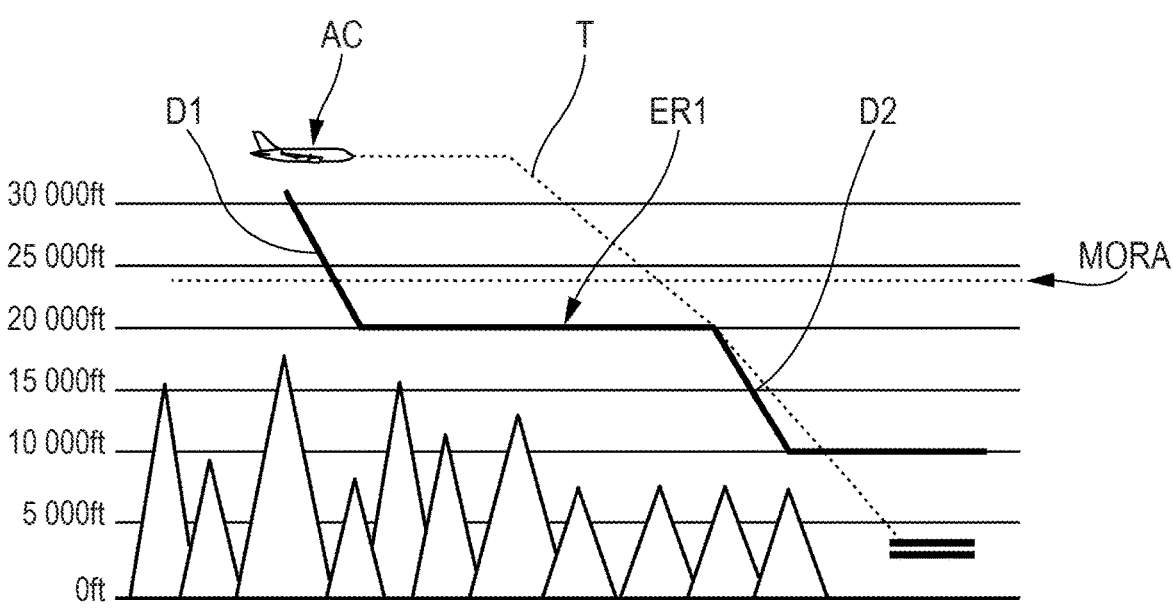
FIG. 3 shows a schematic profile of an emergency vertical trajectory for an aircraft in the event of cabin depressurization.

If cabin depressurization is detected (FIG. 3), the emergency trajectory ER1 is achieved by implementing the AED function of the one or more avionics computers 3. Guidance by this AED function allows the altitude constraints selected by the pilot flying in the secondary flight plan to be reached, in particular in order to reach an altitude below the predetermined MORA safety altitude by constructing successive descents D1, D2. The complete descent is stopped when the survival altitude is reached. The AED function also defines a target speed for the aircraft AC. The trajectory profile T corresponds to a trajectory profile constructed by the one or more avionics computers 3 if no depressurization had been detected.

Figure 4:
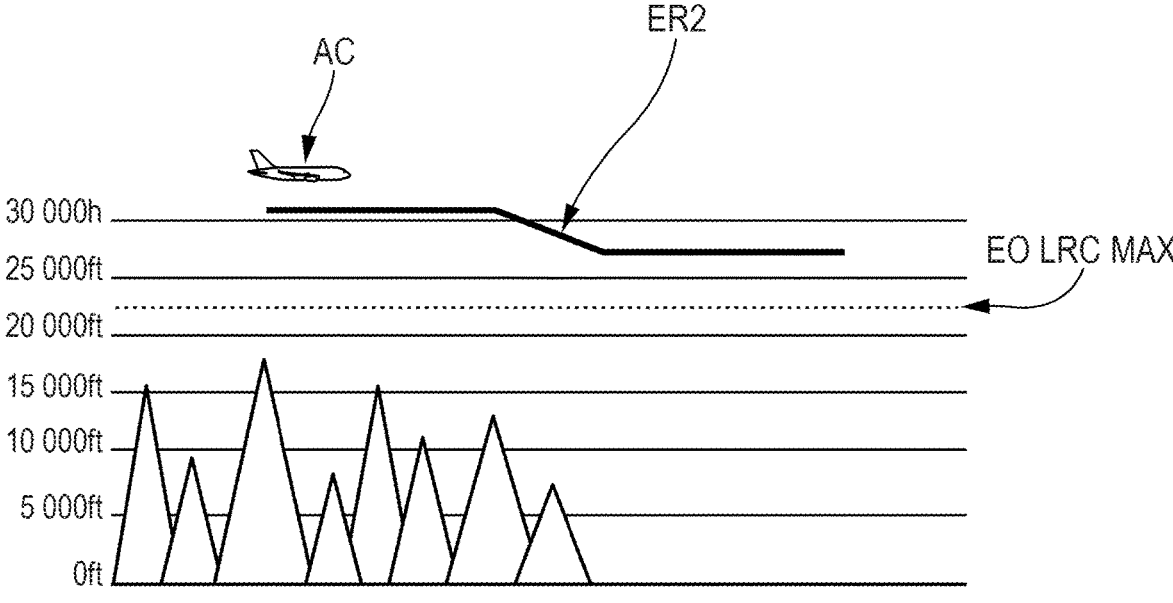
FIG. 4 shows a schematic profile of an emergency vertical trajectory for an aircraft in the event of an engine failure.

If an engine M failure is detected (FIG. 4), for the emergency trajectory ER2, the one or more avionics computers 3 determine a long-range cruise engine-out maximum altitude (LRC EO MAX altitude). The vertical guidance and speed of the aircraft AC are managed, for example, by a primary flight control computer (PRIM). The PRIM computer levels-out the aircraft AC until a "green dot" speed is reached. The "green dot" speed corresponds to a speed at which the lift-to-drag ratio is greatest for the aircraft AC. When the green dot speed is reached, the PRIM computer commands the aircraft to descend toward the LRC EO MAX altitude.

The invention also relates to a method for managing flight management in the event of a challenging context (FIG. 2).

The method is intended to be implemented for an aircraft AC flying in accordance with a main flight plan. The method can be implemented by at least one avionics computer 3 of the aircraft AC.

The method comprises the following steps:

a start-up step E1 for implementing all the subsequent steps when the aircraft AC is in a challenging context;

a preparation step E2;

a warning step E3 implemented by the first module 21 for detecting and warning the pilot flying that erroneous data has been entered into the secondary flight plan during the preparation step E2;

a monitoring step E4:

implemented by the second module 22 for monitoring a pressure in a cabin of the aircraft AC based on pressure measurements transmitted by pressure sensors S1 in the cabin; and implemented by the third module 23 for monitoring the operation of at least one engine M of the aircraft AC based on data transmitted by engine M operation sensors S2;

a determination step E5 implemented by the fourth module 24 for determining the capability of the pilot flying;

an activation step E6 implemented by the fifth module 25 for automatically activating an emergency trajectory corresponding to the emergency trajectory defined between positions of two consecutive waypoints between which the aircraft AC is located.

In the preparation step E2, the pilot flying at the controls of the aircraft AC enters secondary flight plan data into a first memory 6 of the one or more avionics computers 3 using an input device 4. The secondary flight plan data entered by the pilot flying includes at least one identifier of at least one waypoint and at least one altitude constraint of the one or more waypoints. Furthermore, the one or more avionics computers 3 determine secondary flight plan data based on secondary flight plan data entered by the pilot flying and based on the performance capabilities of the aircraft AC. The determined secondary flight plan data includes at least one position of the one or more waypoints and at least one emergency trajectory.

The activation step E6 is implemented:

if the aircraft AC encounters a challenging context;

if, on the one hand, cabin depressurization is detected in the monitoring step E4 or if a failure of at least one engine M is detected in the monitoring step E4; and if, on the other hand, incapacitation of the pilot flying is detected in the determination step E5.

According to the first embodiment, the warning step E3 comprises the following sub-steps:

a first determination sub-step E30a for determining a vertical trajectory based on the one or more identifiers of the one or more waypoints, the one or more positions of the waypoints, the one or more altitudes of the waypoints and the one or more emergency trajectories;

a first transmission sub-step E31a for transmitting the vertical trajectory determined in the first determination sub-step E30a to an altitude database 5;

a second determination sub-step E32a implemented by the altitude database 5 for determining a terrain relief curve corresponding to the vertical altitude data of the vertical trajectory;

a comparison sub-step E33a implemented by the altitude database 5 for comparing the vertical trajectory and the terrain relief curve;

a second transmission sub-step E34a implemented by the altitude database 5 for generating at least one signal representing a warning if the vertical trajectory is likely to cross the terrain relief curve;

a warning sub-step E35a for notifying the pilot flying that erroneous data has been entered into the one or more avionics computers 3.

According to the second embodiment, the warning step E3 comprises the following sub-steps:

a first comparison sub-step E30b for comparing, on the one hand, the one or more identifiers of the one or more waypoints of the secondary flight plan and one or more identifiers of at least one waypoint previously stored in a second memory 7 of the one or more avionics computers 3 and, on the other hand, the one or more altitude constraints of the one or more waypoints of the secondary flight plan and one or more altitude constraints of at least one waypoint previously stored in the second memory 7 of the one or more avionics computers 3;

a second comparison sub-step E30c for comparing an order of waypoints previously stored in the second memory 7 of the one or more avionics computers 3 and an order of waypoints of the secondary flight plan;

a first warning sub-step E31b for notifying the pilot flying that at least one identifier of a waypoint of the secondary flight plan does not correspond to at least one identifier of at least one waypoint previously stored in the second memory 7 of the one or more avionics computers 3 or that at least one altitude constraint of a waypoint of the secondary flight plan does not correspond to at least one altitude constraint of at least one waypoint previously stored in the second memory 7 of the one or more avionics computers 3;

a second warning sub-step E31c for notifying the pilot flying that the order of the waypoints of the secondary flight plan does not correspond to the order of the waypoints previously stored in the second memory 7 of the one or more avionics computers 3.

The activation step E6 can comprise an inhibition sub-step E60 for inhibiting an altitude protection system:

in order to reach the survival altitude within a time corresponding to an oxygen endurance time of the aircraft AC if cabin depressurization is detected; or in order to reach an equilibrium altitude if a failure of at least one engine M is detected.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing a flight in an event of a challenging context, the method implemented for an aircraft flying in accordance with a main flight plan, the method comprising the following steps:

a start-up step for implementing all subsequent steps when the aircraft is in a challenging context;

a preparation step, in which:

a secondary flight plan data is entered by a pilot flying at controls of the aircraft into a first memory of at least one avionics computer on board the aircraft using an input device while the aircraft is in a flight phase, the secondary flight plan data comprising at least one identifier of at least one waypoint and at least one altitude constraint of the at least one waypoint; and further secondary flight plan data is determined by the at least one avionics computer based on the entered secondary flight plan data and on one or more performance capabilities of the aircraft, with the further secondary flight plan comprising at least one position of the at least one waypoint and at least one emergency trajectory;

a warning step implemented by a first module for detecting and warning the pilot flying that erroneous data has been entered into the secondary flight plan during the preparation step representing that the secondary flight plan data entered by the pilot results in an unrecoverable flight path when the secondary flight plan is executed;

a monitoring step:

implemented by a second module for monitoring a pressure in a cabin of the aircraft based on pressure measurements transmitted by pressure sensors in the cabin; and implemented by a third module for monitoring the operation of at least one engine of the aircraft based on data transmitted by engine operation sensors;

a determination step implemented by a fourth module for determining a capability of the pilot flying;

an activation step implemented by a fifth module for automatically activating an emergency trajectory corresponding to the at least one emergency trajectory defined between positions of two consecutive waypoints between which the aircraft is located, the activation step being implemented:

when the aircraft encounters a challenging context;

when, on one hand, a cabin depressurization is detected in the monitoring step or if a failure of at least one engine is detected in the monitoring step; and when, on another hand, incapacitation of the pilot flying is detected in the determination step.

2. The method as claimed in claim 1, wherein the method is implemented when the aircraft is in a flight phase in which a single pilot flying is at the controls of the aircraft.

3. The method as claimed in claim 1, wherein the warning step comprises the following sub-steps:

a first determination sub-step for determining a vertical trajectory based on the at least one identifier of the at least one waypoint, the at least one position of the at least one waypoint, the at least one altitude constraint of the at least one waypoint, and the at least one emergency trajectory;

a first transmission sub-step for transmitting the vertical trajectory determined in the first determination sub-step to an altitude database;

a second determination sub-step implemented by the altitude database for determining a terrain relief curve corresponding to a vertical altitude data of the vertical trajectory;

a comparison sub-step implemented by the altitude database for comparing the vertical trajectory and the terrain relief curve;

a second transmission sub-step implemented by the altitude database for generating at least one signal representing a warning when the vertical trajectory is likely to cross the terrain relief curve, wherein the unrecoverable flight path is defined by the vertical trajectory crossing the terrain relief curve; and, a warning sub-step for notifying the pilot flying that erroneous data has been entered into the at least one avionics computer.

4. The method as claimed in claim 1, wherein the warning step comprises the following sub-steps:

a first comparison sub-step for comparing, on one hand, the at least one identifier of the at least one waypoint of the secondary flight plan and one or more identifiers of at least one waypoint previously stored in a second memory of the at least one avionics computer and, on another hand, the at least one altitude constraint of the at least one waypoint of the secondary flight plan and one or more altitude constraints of at least one waypoint previously stored in the second memory of the at least one avionics computer; and a second comparison sub-step for comparing an order of waypoints previously stored in the second memory of the at least one avionics computer and an order of waypoints of the secondary flight plan;

a first warning sub-step for notifying the pilot flying that the at least one identifier of a waypoint of the secondary flight plan does not correspond to the one or more identifiers of the at least one waypoint previously stored in the second memory of the at least one avionics computer or that the at least one altitude constraint of the at least one waypoint of the secondary flight plan does not correspond to the one or more altitude constraints of the at least one waypoint previously stored in the second memory of the at least one avionics computer; and a second warning sub-step for notifying the pilot flying that the order of waypoints of the secondary flight plan does not correspond to the order of waypoints previously stored in the second memory of the at least one avionics computer.

5. The method as claimed in claim 1, wherein the at least one emergency trajectory corresponds to an emergency trajectory toward a diversion airport, wherein said emergency trajectory is a function of a current position of the aircraft.

6. The method as claimed in claim 1, wherein the at least one emergency trajectory corresponds to a survival evacuation trajectory toward a survival altitude.

7. The method as claimed in claim 1, wherein the activation step comprises an inhibition sub-step for inhibiting an altitude protection system in order to reach a survival altitude within a time corresponding to an oxygen endurance time of the aircraft when cabin depressurization is detected or in order to reach an equilibrium altitude when a failure of at least one engine is detected.

8. A device for managing flight in the event of a challenging context, the device being installed on board an aircraft flying in accordance with a main flight plan, the device comprising:

a first module configured for detecting and warning that erroneous data has been entered into a secondary flight plan when a pilot flying at controls of the aircraft has entered secondary flight plan data into a first memory of at least one avionics computer on board the aircraft using an input device while the aircraft is in a flight phase, the secondary flight plan data comprising at least one identifier of at least one waypoint and at least one altitude constraint of the at least one waypoint, the at least one avionics computer being configured for determining further secondary flight plan data based on the secondary flight plan data entered by the pilot flying and based on one or more performance capabilities of the aircraft, the further secondary flight plan data comprising at least one position of the at least one waypoint and at least one emergency trajectory, the first module further configured for determining whether erroneous data has been entered into the secondary flight plan representing that the secondary flight plan data entered by the pilot results in an unrecoverable flight path when the secondary flight plan is executed;

a second module configured for monitoring a pressure in a cabin of the aircraft based on pressure measurements transmitted by pressure sensors in the cabin; and a third module configured for monitoring an operation of at least one engine of the aircraft based on data transmitted by engine operation sensors;

a fourth module configured for determining a capability of the pilot flying;

a fifth module configured for automatically activating an emergency trajectory corresponding to the at least one emergency trajectory defined between positions of two consecutive waypoints between which the aircraft is located, the emergency trajectory being activated:

when the aircraft encounters a challenging context;

when, on one hand, cabin depressurization is detected by the second module or when a failure of at least one engine is detected by the third module; and when, on another hand, incapacitation of the pilot flying is detected by the fourth module.

9. The device as claimed in claim 8, wherein the first module is further configured for:

determining a vertical trajectory based on the at least one identifier of the at least one waypoint, the at least one position of the at least one waypoint, the at least one altitude constraint of the at least one waypoint, and the at least one emergency trajectory;

transmitting the vertical trajectory to an altitude database so that the altitude database determines a terrain relief curve corresponding to a vertical altitude data of the vertical trajectory;

notifying the pilot flying that erroneous data has been entered into the first memory of the at least one avionics computer after the altitude database has compared the vertical trajectory and the terrain relief curve and has generated a signal representing a warning when the vertical trajectory is likely to cross the terrain relief curve, wherein the unrecoverable flight path is defined by the vertical trajectory crossing the terrain relief curve.

10. The device as claimed in claim 8, wherein the first module is configured for:

comparing, on one hand, the at least one identifier of the at least one waypoint of the secondary flight plan and one or more identifiers of at least one waypoint previously stored in a second memory of the at least one avionics computers and, on another hand, the at least one altitude constraint of the at least one waypoint of the secondary flight plan and one or more altitude constraints of at least one waypoint previously stored in the second memory of the at least one avionics computer;

comparing an order of waypoints previously stored in the second memory of the at least one avionics computer and an order of waypoints of the secondary flight plan;

notifying the pilot flying that the at least one identifier of the at least one waypoint of the secondary flight plan does not correspond to the one or more identifiers of the at least one previously stored waypoint or that the at least one altitude constraint of the at least one waypoint of the secondary flight plan does not correspond to the one or more altitude constraints of the at least one waypoint previously stored in the second memory of the at least one avionics computer; and, notifying the pilot flying that an order of waypoints of the secondary flight plan does not correspond to the order of waypoints previously stored in the second memory of the one or more avionics computers.

11. The device as claimed in claim 8, wherein the at least one emergency trajectory corresponds to an emergency trajectory toward a diversion airport, wherein said emergency trajectory is a function of a current position of the aircraft.

12. The device as claimed in claim 8, wherein the at least one emergency trajectory corresponds to a survival evacuation trajectory toward a survival altitude.

13. The device as claimed in claim 8, wherein, in order to automatically activate the at least one emergency trajectory, the fifth module is further configured for inhibiting an altitude protection system in order to reach a survival altitude within a time corresponding to an oxygen endurance time of the aircraft when cabin depressurization is detected or in order to reach an equilibrium altitude when a failure of the at least one engine is detected.

14. An aircraft comprising:

the device of claim 8.

* * * * *